Patented Oct. 9, 1923.

1,469,826

UNITED STATES PATENT OFFICE.

PAUL C. SEEL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No Drawing. Application filed January 5, 1923. Serial No. 610,923.

*To all whom it may concern:*

Be it known that I, PAUL C. SEEL, a citizen of the United States of America, residing at Rochester, in the county of Monroe and State of New York, have invented certain new and useful Improvements in Cellulose-Ether Compositions, of which the following is a full, clear, and exact specification.

This invention relates to new compositions of matter in which cellulose ethers are mixed with other sustances so that the resulting product can be advantageously used in the plastic and analogous arts, such, for instance, as sheet or film manufacture and varnish manufacture.

One object of my invention is to provide a composition which may be made into transparent, strong and flexible sheets, films or moulded articles which possess the desired properties in the plastic arts. Further objects will hereinafter appear.

I have discovered that a composition of matter having the properties desired in the above mentioned arts can be obtained by mixing cellulose ether, say of the type indicated in U. S. Patent, No. 1,188,376, Lilienfeld, June 20, 1916, with mesityl oxide. Mesityl oxide by itself has the surprising property of forming thick solutions of the ethers; but it may also be employed in conjunction with other compounds to meet technical requirements, as will be apparent to those skilled in the art.

By way of illustration I dissolve cellulose ether, say water-insoluble ethyl cellulose in mesityl oxide until a strong, viscous, homogeneous solution is obtained. For instance, in the preparation of films I may obtain such a concentrated solution as 1 part of the ether by weight to from 5 to 7 parts of the mesityl oxide. Any desired dilution with mesityl oxide can, of course, be effected. Mesityl oxide, as indicated by its high boiling point, has a relatively small volatility and consequently film formed from a solution of cellulose ether in it alone cures rather slowly. In order to facilitate a more rapid setting of the film under manufacturing conditions and to meet other technical requirements of the process I may add other substances as a vehicle in which to carry the ether and mesityl oxide.

For instance, I may dissolve 100 parts by weight of cellulose ether in a mixture containing 20 parts of mesityl oxide, 450 parts of methyl acetate and 50 parts of methyl alcohol. Upon evaporation this solution leaves a film containing the cellulose ether with sufficient mesityl oxide to impart valuable properties to it. The volatile vehicle passes away at such a rate that the product is not impaired, yet the curing is not undesirably prolonged.

Other substances which impart useful qualities to the film may be added if desired, such, for instance, as triphenyl or tricresyl phosphate, camphor, monochlornaphthalene, but these are not indispensable. The ingredients are of the commercial type and are sufficiently purified for the process of film manufacture, so as to give a dope yielding films having the proper relative freedom from color.

Having thus described my invention what I claim as new and desire to secure by Letters Patent is:

1. A composition of matter comprising cellulose ether and mesityl oxide.

2. A composition of matter comprising ethyl cellulose and mesityl oxide.

3. A flowable composition of matter comprising cellulose ether, mesityl oxide and a volatile vehicle carrying such ingredients.

4. A flowable film-forming composition of matter comprising water-insoluble ethyl cellulose, mesityl oxide and a volatile vehicle containing methyl acetate and methyl alcohol.

5. As an article of manufacture, a deposited or flowed flexible film comprising cellulose ether and mesityl oxide.

Signed at Rochester, New York, this 20th day of Dec., 1922.

PAUL C. SEEL.